United States Patent [19]

Shan et al.

[11] Patent Number: 5,276,870
[45] Date of Patent: Jan. 4, 1994

[54] VIEW COMPOSITION IN A DATA BASE MANAGEMENT SYSTEM

[75] Inventors: Ming-Chien Shan, San Jose; Peter Lyngbaek, Mountain View, both of Calif.

[73] Assignee: Hewlett-Packard Company, Palo Alto, Calif.

[21] Appl. No.: 595,717

[22] Filed: Oct. 9, 1990

Related U.S. Application Data

[63] Continuation of Ser. No. 131,876, Dec. 11, 1987, abandoned.

[51] Int. Cl.⁵ .......................................... G06F 15/403
[52] U.S. Cl. .................................. 395/600; 364/974; 364/974.6; 364/978; 364/DIG. 2
[58] Field of Search ....... 395/600; 364/DIG.1, DIG. 2

[56] References Cited

U.S. PATENT DOCUMENTS

| | | | |
|---|---|---|---|
| 4,497,039 | 1/1985 | Kitakami et al. | 364/900 |
| 4,506,326 | 3/1985 | Shaw et al. | 364/300 |
| 4,631,673 | 12/1986 | Haas et al. | 364/300 |
| 4,644,471 | 2/1987 | Kojima et al. | 364/300 |
| 4,688,195 | 8/1987 | Thompson et al. | 364/300 |
| 4,769,772 | 9/1988 | Dwyer | 364/300 |
| 4,791,561 | 12/1988 | Huber | 395/600 |
| 4,805,099 | 2/1989 | Huber | 364/300 |
| 4,888,690 | 12/1989 | Huber | 395/600 |
| 4,918,593 | 4/1990 | Huber | 395/600 |
| 4,930,071 | 5/1990 | Tou et al. | 395/600 |
| 5,097,408 | 3/1992 | Huber | 395/600 |

FOREIGN PATENT DOCUMENTS 2172130  3/1986  Japan .

OTHER PUBLICATIONS

Roussopoulos, Nicholas: "View Indexing in Relational Databases", ACM Transactions on Database Systems, vol. 7, No. 2, Jun. 1982, pp. 258-290.
Rowe et al: "Data Abstraction, Views and Updates in RIGEL", *The Ingres Papers: Anatomy of a Relational Database System*, Addison-Wesley Publ., 1986, pp. 278-294.
Dayal et al. "On the Updatability of Relational Views", Proceedings of 4th Internatinoal Conf. on Very Large Databases, Sep. 1978, pp. 368-377.
K. C. Kinsley et al.: "A Generalized Method for Maintaining Views", AFIPS Conference Las Vegas, Nevada, Jul. 9-12, 1984, pp. 587-593.
S. Talbot: "An Investigation into Logical Optimization of Relational Query Languages" The Computer Journal, vol. 27, No. 4, No. 1984, pp. 301-309.
S. Hanara et al: "Conversational Database Query Language", Review of the Electrical Communication Laboratories, vol. 29, Nos. 1-2, Jan./Feb. 1981, pp. 32-50.
C. J. Date: "An Introduction to Data Base Systems", 3rd Edition, Section 9, The External Level of System R, Nov. 1974, pp. 159-168.

Primary Examiner—Thomas C. Lee
Assistant Examiner—Maria N. Von Buhr

[57] ABSTRACT

In a database management system that operates according to the Structured Query Language standard, a query containing a reference to a view is processed by dynamically materializing the view through execution of the view definition. Once the view is materialized, it is treated as any other base table. To enable a query optimization plan to refer to the materialized view, a view node is introduced into the execution plan. The view node includes a subquery that results in the creation of the virtual table defined by the view. This created table is temporarily stored in a memory. The query optimizer can treat view nodes in the same manner as stored base tables, and thereby overcomes restrictions that were placed upon views by previous view decomposition approaches.

3 Claims, 3 Drawing Sheets

VIEW COMPOSITION IN A DATA BASE MANAGEMENT SYSTEM

CROSS REFERENCE TO RELATED APPLICATIONS

This is a continuation of copending application 7/131,876 filed on Dec. 11, 1987, now abandoned.

BACKGROUND OF THE INVENTION

The present invention is directed to data base systems, and more particularly to a technique which enables data to be efficiently retrieved with the use of views having complex definitions. Although not limited thereto, the invention is particularly concerned with the standard for relational data bases known as "Structured Query Language" (SQL) and the constraints imposed thereby. For further detailed information relating to this standard, reference is made to Date, *A Guide To The SQL Standard* (1987) and Date, *A Guide To DB2* (1985).

In relational data base management systems of the type to which the SQL standard pertains, data is stored in the form of base tables. Each base table essentially consists of a series of fields which define columns of the table. Each row of the table comprises a single record, also referred to as a "tuple." For each row of data in a table, a counterpart of that data is physically stored in the data base. When the data base user accesses a base table, the appropriate portion of the stored data is retrieved and presented to him in the form of a table.

In addition to base tables, data can also be accessed by means of "views." In contrast to a base table, a view is a "virtual" table in that the table does not directly exist in the data base as such, but appears to the user as if it did. In fact, the view is stored in the data base only in terms of its definition. For example, a view might comprise a subset of a base table, such as those tuples of the table which have a predetermined value in a particular field. As another example, a view could comprise a join operation, e.g. union, of two or more tables, where these other tables can be base tables, other views or a combination of both.

In relational data base systems that comply with the SQL standard, desired information is searched for and retrieved by means of expressions known as queries. For example, if a table named "Employee" contains the fields "Name", "Dept", "Age" and "Salary", and a user desires to find the subset of employees who work in the toy department, the following query can be used:

```
SELECT  Name, Salary, Age
FROM    Employee
WHERE   Dept = "Toy"
```

If it is known that the information produced by this query will be used several times, a view can be defined, to thereby avoid the need to reformulate the query each time the information is desired. A view named "Emptoy" which produces the same information can be defined by means of the following statement:

```
CREATE VIEW  Emptoy (Name, Salary, Age) AS
SELECT       Name, Salary, Age
FROM         Employee
WHERE        Dept = "Toy"
```

With this view created, the original query would then become:

```
SELECT *
FROM Emptoy
```

(where the character "*" is a universal character to designate all fields in the table or view). As can be seen, the prior definition of the view makes the query much easier to formulate.

In addition, this view can be the subject of a further query. For example, to obtain the salary of all employees named Johnson in the toy department, the following query can be entered:

```
SELECT  Salary
FROM    Emptoy
WHERE   Name = "Johnson"
```

As noted above, the data which makes up the virtual table Emptoy is not actually stored as such in the data base. Rather, only the definition of the view is stored. Accordingly, when a query which references a view is entered, a process known as view decomposition is carried out to translate the query into an equivalent query which references only stored base tables. In essence, the view decomposition process comprises the steps of replacing the reference to the view in the query with the definition of that view. Thus, in the example given above, the query for obtaining the salary of the employees named Johnson in the toy department would be modified to produce the following equivalent query:

```
SELECT  Salary
FROM    Employee
WHERE   Name = "Johnson" and Dept = "Toy"
```

As can be seen, the modified query refers only to base tables and fields within that table.

In principle, it should be possible for a query to reference any view defined by an arbitrary query, and to translate that query into an equivalent operation on the underlying base tables. In practice, however, the applicability of this procedure is quite limited because of restrictions imposed by the SQL standard. For example, a view labeled "Avgsal" can be defined from two base tables Dept and Emp. The table Dept contains the fields "Dno" (department number), "Dname", "Mgrname" and "Loc", and the table Emp contains the fields "Eno" (employee number), "Dno", "Salary" and "Jobtitle". The definition of the view Avgsal which describes a department by its department number, department name and the average salary of its employees could appear as follows:

```
CREATE VIEW Avgsal  (Dno, Dname, Avgsalary) AS
SELECT              Dno, Dname, AVG(Salary)
FROM                Dept, Emp
WHERE               Dept.Dno = Emp.Dno
GROUP BY            Dno
```

A query that asks for the location of all departments whose employees have an average salary greater than $30,000 would require a join operation on the base table Dept and the view Avgsal and could appear as follows:

```
SELECT  Loc
FROM    Dept, Avgsal
WHERE   Dept.Dno = Avgsal.Dno and
        Avgsal.Avgsalary > 30,000
```

Unfortunately, the limitations of the view decomposition technique prevent the processing of this query. More particularly, the query cannot be processed because the WHERE clause contains reference to a virtual column Avgsalary which does not correspond to an existing column of a base table.

Basically, the translated form of an original query must always be a legal query itself. Thus, the applicability of view decomposition is limited to views which are relatively simple. Hence, it is desirable to provide a technique which enables views with a greater degree of complexity to be referenced in queries, and thereby expand the processing power of a database system.

BRIEF STATEMENT OF THE INVENTION

In accordance with the present invention, the limitations associated with view decomposition can be overcome by means of a technique that is referred to herein as view composition. In this technique, a query containing a reference to a view is processed by dynamically composing, or materializing, the view at run time through the execution of the corresponding view definition. Once the view is composed, it can be subsequently treated as any other base table. If a view contains a reference to other views, the other views are first processed to provide the information for the subsequently composed view.

Since the materialized view is treated as a base table, reference must be made to this materialized view in a query execution plan. To perform this function, a new type of node, referred to herein as a view node, is introduced into the query execution plan to represent views and their materialization. A view node functions similarly to a table node that represents a stored base table. However, in contrast to a table node there is no permanent stored table in the database which corresponds to the view node. Rather, the view node has a subquery that defines the creation of the virtual table. The query optimizer can treat view nodes in exactly the same manner as stored base tables. As a result, restrictions that were placed upon views by the view decomposition process are removed.

To enable the query optimizer to treat a view as a table, certain statistical information (for example, the number of tuples in a view) is needed. In the past, this type of information has only been available for base tables, and not for views. In accordance with one aspect of the present invention, however, such information is maintained for views as well.

Further features of the invention and the advantages offered thereby are described hereinafter in greater detail with reference to specific examples and with the aid of the accompanying drawings.

DESCRIPTION OF THE PREFERRED EMBODIMENTS

Figure 1:
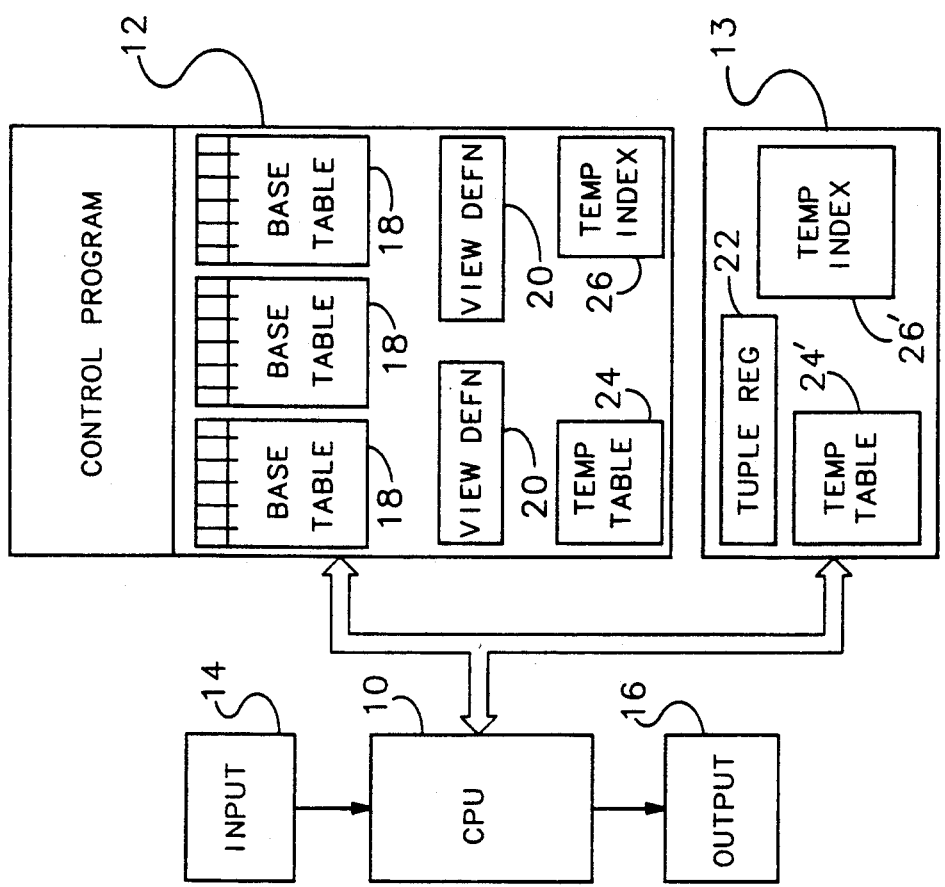
FIG. 1 is a generalized block diagram of a database system.

Referring to FIG. 1, a general overview of a database system is illustrated in block diagram form. The main components of the system comprise a central processing unit 10, a permanent memory unit 12 such as a magnetic disk or tape, and a main or non-permanent memory unit 13 such as a RAM. To enable the user to enter data and retrieve information, a suitable input device 14, such as a keyboard, is connected to the CPU 10. In addition, the information retrieved by the database system is provided to the user through a suitable output device 16, such as a video monitor and/or a printer.

Within the permanent memory unit 12, a control program is stored along with the data that makes up the database. Examples of relational database management systems that operate according to the SQL standard include SQL/DS and DB2 of IBM Corp., and RTI Ingres. The data entered by the user is stored in the permanent memory unit 12 in the form of base tables 18. At the outset, the user defines each table, including the headings for each column in the table and the parameters of each column. Thereafter, data is entered to fill in the tuples of the various base tables.

In addition, views can be defined to indicate a subset of a particular table, a relationship between two or more tables, or an operation upon the information in one or more base tables. While the information obtained by the definition of a view is presented to the user at the output device 16 in the form of another table, this table is not permanently stored as such in the memory unit 12. Rather, only the definition 20 itself is permanently stored in the memory.

When a query is to be processed, it is first presented to an optimizer which comprises a portion of the control program. The optimizer evaluates the query and the tables referenced thereby, and develops a query execution plan that is intended to optimize the performance of the system in the processing of the query. Basically, the optimizer takes into account the cardinality, i.e., the number of tuples, in each table, the selectivities of the search conditions, and indexes which may be defined on each table. Based upon this information, the optimizer develops an execution plan that results in efficient utilization of the processing power of the CPU.

For example, a query which requires a join operation on three base tables T1, T2 and T3 might appear as follows:

```
SELECT *
FROM T1, T2, T3
WHERE T1.f1 = T2.f2 and T1.f1 = T3.f3
```

Figure 2:
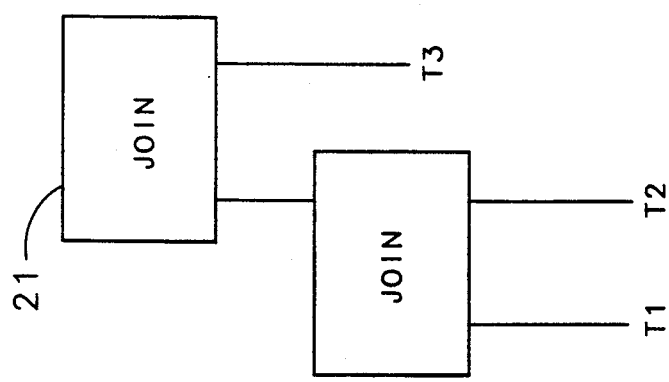
FIG. 2 is a block diagram representation of a query execution plan.

In the foregoing statement, the term "T1.f1" represents the first field in the base table T1, "T2.f2" represents the second field in the base table T2, etc. In response to this query, the optimizer might generate a query execution plan as shown in FIG. 2. Basically, this plan indicates that the join operation on the tables T1 and T2 is first carried out, i.e., the tuples where T1.f1=T2.f2 are located. The results of this first join operation are then joined with table T3 to produce the final result, which is provided to the user on the output device 16.

The particular position of each table in the execution plan is significant. In operation, the table on the left hand side of a join node functions as the outer, or primary, table. Each tuple of the outer table is selected once, and for each such selection all of the tuples of the inner, or secondary, table on the right hand side of the node are scanned. Hence, in the example of FIG. 2, the inner table T2 will be scanned a number of times equal to the number of tuples in the outer table T1. Then, the upper node 21 will sequentially request the tuples in the result of this first join operation and the inner table T3 will be scanned for each such tuple.

In accordance with the present invention, a query which references a view can be processed by dynamically executing the definition of the view during the run-time for the query. For a given query, a view might be processed by such execution or by view decomposition. The execution of the definition results in the composition of a table that can be subsequently treated in the manner of base tables during the query execution. In the prior art data retrieval technique which employed only view decomposition, a query which referenced a view was translated into an equivalent query that referred only to base tables. Hence, it was unnecessary for the query execution plan to refer to views. However, a query execution plan which is produced by the view composition technique of the present invention must be able to refer to views as well as base tables. To meet this need, another type of node referred to as a view node is introduced into the query execution plan to represent views and their materialization. A view node is essentially similar to a table node which represents a stored base table. However, in contrast to the table node there is no permanent stored table in the database memory 12 which corresponds to a given view node. Rather, the view node comprises a subquery that defines a table.

To further illustrate, a view might be defined as a join operation on base tables T1 and T2 according to the following statement:

```
CREATE VIEW V AS
SELECT *
FROM T1, T2
WHERE T1.f1 = T2.f2
```

Figure 3:
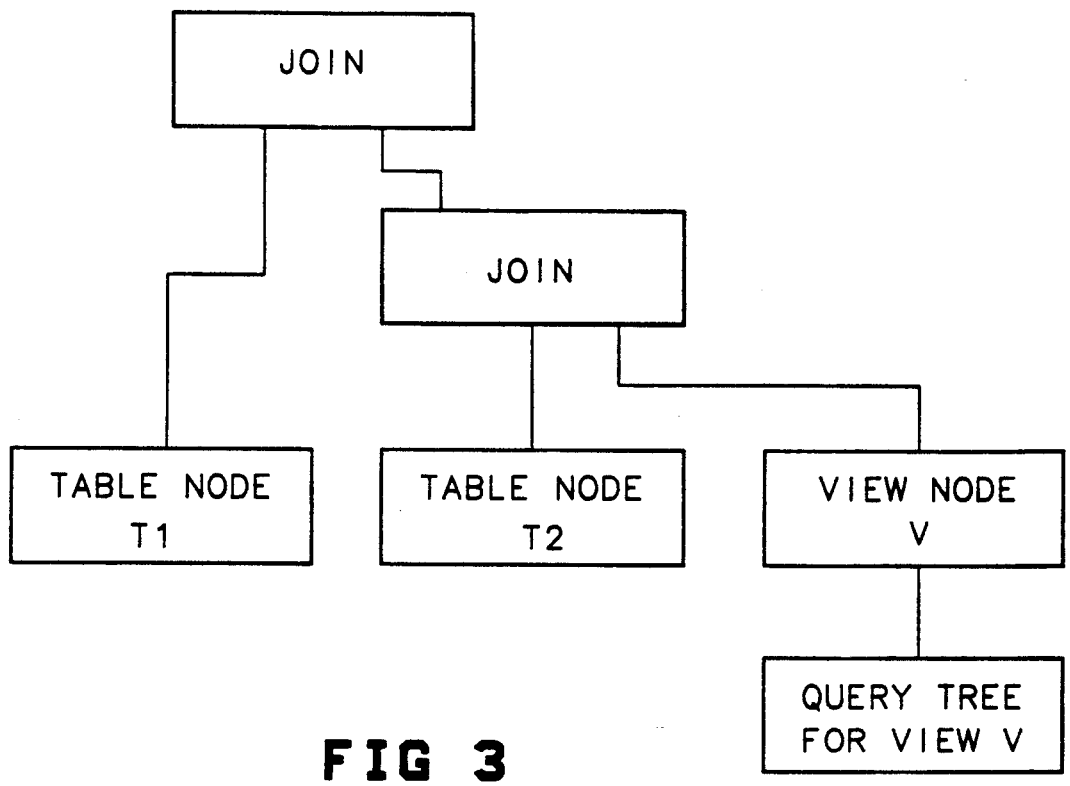
FIG. 3 is a block diagram representation of a query execution plan utilizing view composition.

An example of a query execution plan with a view node which specifies the materialization of the view V is shown in FIG. 3 for the following query:

```
SELECT *
FROM T1, T2, V
WHERE T1.f2 = T2.f1 and T2.f2 = V.f3
```

A particular advantage of the view composition technique is that it enables the query optimizer to treat view nodes in the same manner as table nodes, with all their explicit and implicit ordering properties as well as employ other necessary statistical data normally associated with tables, e.g. cardinality, selectivity, etc. In conventional practice, only base tables were considered as inner nodes. However, with the view composition approach, a view node can appear as the inner subtree of a join node in a query execution plan, giving the query optimizer more options in selecting an optimal strategy.

Different approaches can be used for composing the view. In one possible implementation of the view composition approach, the tuples of a view are materialized on demand as they are requested by the parent of the view node. This strategy may be the most preferable in situations such as a nested loop join operation in which the view is chosen as the outer, i.e., left hand, table in the execution plan. In operation, the first tuple of the view is materialized when called for by the parent of the view node. This materialized tuple can be temporarily stored in a register or buffer 22 in the system memory (FIG. 1). Preferably, this register is located in the temporary memory 13, rather than a permanent memory such as the memory unit 12. When the next tuple is requested during query execution, it is materialized and replaces the previous tuple in the register 22.

A second possible implementation of the view composition approach materializes the entire view at once when the view node is first addressed in the query execution plan. The materialized view is stored as a temporary table 24 in the memory unit 12. Normal cache techniques can be applied to transfer the temporary table to the main memory 13 where the transferred table 24' is operated upon during query execution. When the tuples of the materialized view are requested by the node immediately above the view node, they are obtained from one of the temporary tables 24 or 24', depending on whether the temporary table has been cached. This approach introduces the cost of creating and populating a temporary table, so that it is preferable to use it only in those situations in which the view is to be referred to more than once. For example, this situation might occur in nested loop join operations in which the view is chosen as the inner table, or in queries with multiple references to the same view.

If the query optimizer deems it worthwhile, temporary indexes may be generated for the materialized views. For example, an index 26 may be generated and stored in the memory unit 12 or, if preferred, an index 26' may be generated and stored in the main memory 13 if the materialized view is to be accessed on the same columns more than one time.

As noted above, the materialization of a view offers greater flexibility to the optimizer. For example, statistical information that is important for query optimization, such as the cardinality and selectivity of a view, can be generated. In addition, the materialization of the view increases the functionality of the database system. For example, the tuples of a materialized view can be scanned in accordance with a certain order or grouping, and mathematical or statistical operations can be performed on them.

A materialized view, whether stored tuple by tuple in the register 22 or as an entire table in the temporary table 24, is only maintained until the termination of the execution of the query in which the view is materialized. Thus, it is not necessary to maintain consistency between materialized views and their underlying base tables.

Although the view composition approach adds the expense of materializing a view, the enhanced performance which it provides, particularly the ability to support queries which reference complex views, more than justifies the expense. A query which specifies a join operation on the view V and another table T3 might appear as follows:

```
SELECT *
FROM V, T3
WHERE V.f1 = T3.f3
```

Figure 4:
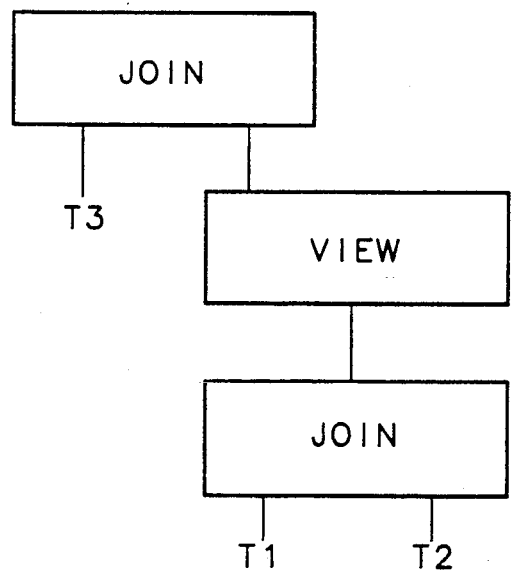
FIG. 4 is a block diagram representation of another query execution plan utilizing view composition.

If the view decomposition approach is utilized, a possible query execution plan may appear as shown in FIG. 2. However, this may not be the optimal plan in some situations. For example, if all three base tables are large, but the cardinality of the view V is small, an optimal query plan based on view composition might appear as shown in FIG. 4. With this approach, the temporary table that results from the view composition requires a join operation on tables T1 and T2, which might be expensive, to be carried out only once, rather than for each tuple in the table T3 as required by the decomposition approach. If the view is small enough to fit in the main memory 13 of the data management system, the join operation on the table T3 and the materialized view will be performed even more efficiently.

While view composition might be the better approach in many types of queries, certain situations will still provide optimal performance if view decomposition is employed. Thus, a preferred optimizer should consider both approaches in developing an optimal query execution plan. In a relatively simple implementation of this concept, the optimizer could utilize view decomposition for all single-table views, i.e., those views which reference only a single base table, and view composition for all other views. However, queries which contain certain other types of simple views that reference more than a single base table might also perform better with view decomposition. Thus, a more preferable optimizer would classify views into three types:

1) Single-table views, i.e., those which reference only a single base table;
2) Complex views, i.e., those which use any one or more of the statements UNION, ORDER BY, GROUP BY, DISTINCT, or which derive columns from built-in functions or operational expressions, or which reference other complex views;
3) Simple views, i.e., all views other than single-table views and complex views.

In operation, the optimizer would structure an execution plan so that all complex views are processed by view composition, all single-table views are processed by view decomposition, and simple views are processed by either approach in dependence upon which is the most efficient.

Figure 5:
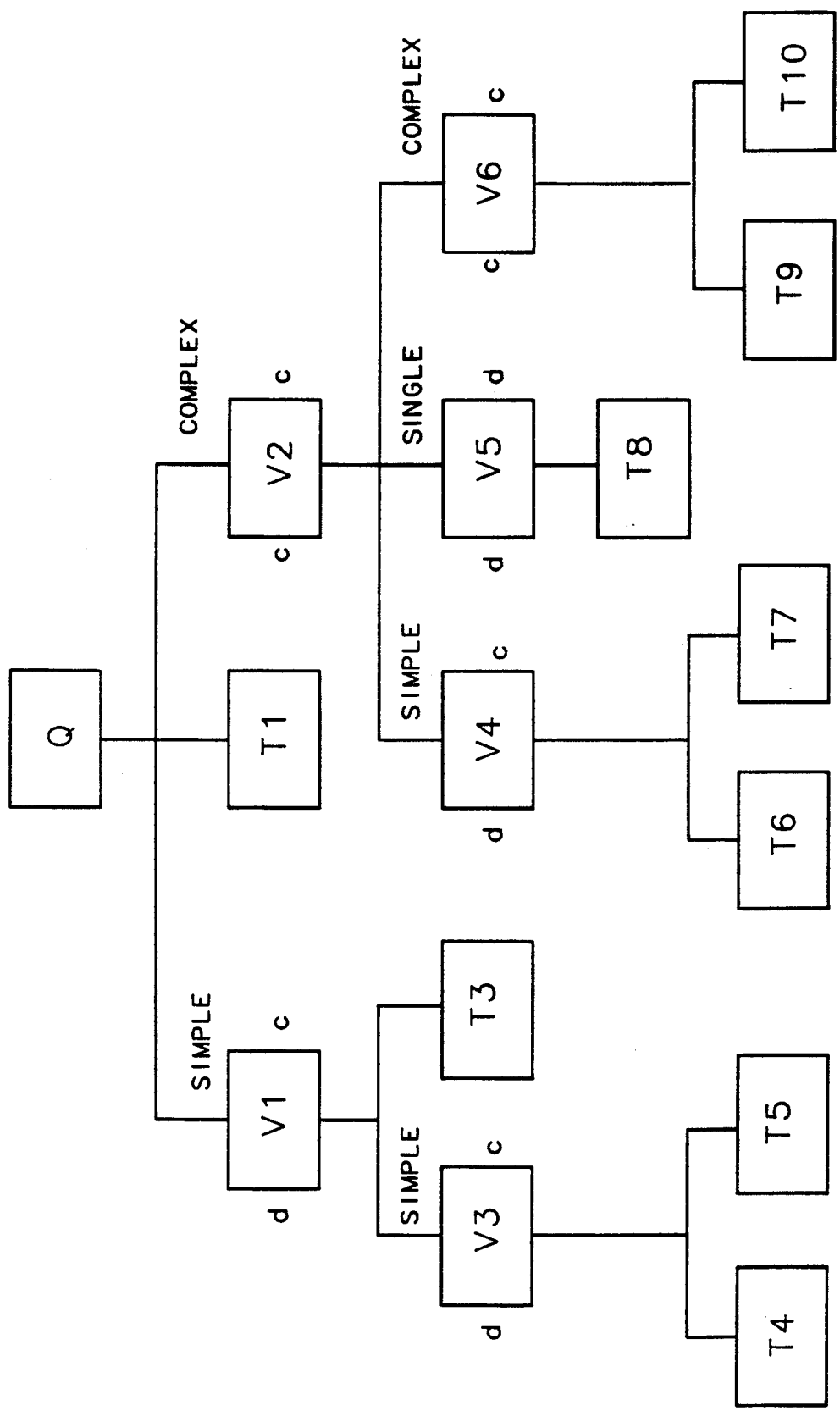
FIG. 5 is a block diagram representation of a query execution plan which employs both view composition and view decomposition.

An example of a query execution plan which employs the foregoing principles is shown in FIG. 5. This query represents a join operation on a table T1 and two views V1 and V2. The view V1 is defined as a join operation on a view V3 and a table T3. The view V3 is defined as a join operation on two tables T4 and T5 and is a simple view. The view V2 is defined as the join operation involving three views V4, V5 and V6. The view V4 is a simple view defined as the join operation involving two tables T6 and T7. The view V5 is a single table view defined on the table T8. The view V6 is a complex view defined as a join operation on two tables T9 and T10. The view V2 is defined as a complex view since it references the complex view V6.

The query tree shown in FIG. 5 is annotated to indicate how each view is processed in each of two modes referred to as decomposition and composition. On the left side of each view node is an indication of how the view is processed in the decomposition mode, where d means decomposition of the view and c means composition of the view. On the right side is an indication of how the view is processed in the composition mode. The views V6 and V2 will always be materialized since they are complex and the view V5 will always be decomposed since it is a single table view. However, the query optimizer will consider both view composition and view decomposition for views V1, V3 and V4, and choose the most efficient.

In the example given above, the views V1, V3, and V4 can always be processed by the same technique, depending on whether the decomposition mode or the composition made is chosen. It may be preferable, however, to consider mixed strategies for simple views In this regard the temporary tables resulting from view materialization may have indexes defined on them to facilitate subsequent accesses to the temporary tables.

While the concept of materialization has been presented with regard to views in query plans, it can be generalized to subtrees of query trees. Any subtree of a given query tree can be materialized and possibly stored in a temporary table. This technique can be used in query optimization exactly for the same reasons view composition may benefit query performance For example, if a query tree has a subtree that is executed many times, the query may be optimized by materializing the subtree and storing the result in a temporary table the first time the subtree is materialized. Successive executions of the subtree thereby reduce to scans of the temporary table. Such an approach to query optimization is advantageous if the cardinality of the materialized subtree is small or the computation of the subtree is expensive.

It may be beneficial to store the result of a subtree that is executed many times in a temporary table only if the subtree has the same value in each materialization i.e., no correlated variables appear in the subtree. However, even if the value of a subtree depends on a correlated variable it may still be worthwhile to materialize and temporarily store a less restricted table which does not depend on the value of the correlated variable. The result of the subtree can then be obtained by further processing the temporary table.

The following query illustrates an example of this approach to query optimization:

```
SELECT *
FROM T1
WHERE T1.f1 IN (
    SELECT T3.f1
    FROM V, T3
    WHERE T3.f3 = V.f1 and V.f2 = T1.f1)
```

The tables T1, T2, and T3 and the view V are as described previously with regard to the example of FIG. 4. The subquery is executed for each tuple in T1. The cost of repeatedly executing the view V can be avoided if the view is materialized once and the result stored in a temporary table. Even if the view is materialized, it is still necessary to do a fair amount of work, e.g., to join T3 and selected tuples of the materialized view, in order to compute the result of the subquery. This work must be repeated for every tuple in T1. The re-computations of the subquery can be avoided by materializing the entire subquery once and storing it in a temporary table.

In some cases, this approach may not be totally feasible since the result of the subquery depends on the value of T1.f1. As an alternative, a less restricted subquery, defined below as the join involving table T3 and the view V, could be materialized:

```
SELECT T3.f1, V.f2
FROM V, T3
WHERE T3.f3 = V.f1
```

Since the value of this less restricted subquery does not depend on any correlated variable, it can be materialized once and stored in a temporary table for reuse. In order to compute the entire subquery a select operation is then performed on the temporary table.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range of equivalents thereof are intended to be embraced therein.

What is claimed is:

1. In a database system having data and a plurality of view definitions stored in a memory of a computer, the data arranged in base table and each view definition defining a view in terms of the base tables, a method of processing a query that reference one or more of the views, the method comprising:

classifying any view that is defined in terms of only one base table as a single-table view;

classifying any view that is not a single-table view and that is defined in terms of execution of a predetermined operation on a base table as a complex view;

classifying any view that is not a single-table view and that is not a complex view as a simple view;

selecting every view that has been referenced by the query and that has been classified as a complex view;

composing a view table according to the definition of each selected view by retrieving the stored data and manipulating the retrieved data in the computer according to said definition to provide tuples of the view table;

evaluating the query by manipulating the provided view table tuples in the computer according to the query to obtain a result; and providing a result of the evaluation.

2. In a database system having data and a plurality of view definitions stored in a memory of a computer, the data arranged in base tables and each view definition defining a view in terms of the base tables, a method of processing a query that references one or more of the views, the method comprising:

classifying any view that is defined in terms of only one base table as a single-table view;

classifying any view that is not a single-table view and that is defined in terms of execution of a predetermined operation on a base tables as a complex view;

classifying any view that is not a single-table view and that is not a complex view as a simple view;

determining whether the computer would evaluate the query more rapidly by composing a view table according to the definition of each complex view that is referenced by the query or by not composing such view table;

selecting each complex view that is referenced by the query if an only if the result of the preceding step is that the computer would evaluate the query more rapidly by composing such view table;

composing a view table according to the definition of each selected view by retrieving the stored data and manipulating the retrieved data in the computer according to said definition to provide tuples of the view table;

evaluating the query by manipulating the provided view table tuples in the computer according to the query to obtain a result; and providing a result of the evaluation.

3. In a database system having data and a plurality of view definitions stored in a memory of a computer, the data arranged in base tables and each view definition defining a view in terms of the base tables, a method of processing a query that references one or more of the views, the method comprising:

classifying any view that is defined in terms of only one base table as a single-table view;

classifying any view that is not a single-table view and that is defined in terms of execution of a predetermined operation on a base table as a complex view;

classifying any view that is not a single-table view and that is not a complex view as a simple view;

determining whether the computer would evaluate the query more rapidly by composing a view table according to the definition of any one of the complex views that is referenced by the query or by not composing any such view tables;

selecting all the complex views that are referenced by the query if and only if the result of the preceding step is that the computer would evaluate the query more rapidly by composing any one of such view tables;

composing a view table according to the definition of each selected view by retrieving the stored data and manipulating the retrieved data in the computer according to said definition to provide tuples of the view table;

evaluating the query by manipulating the providing view table tuples in the computer according to the query to obtain a result; and providing a result of the evaluation.

* * * * *